May 12, 1970     SOHEI SUZUKI     3,511,536

BENCH

Filed Aug. 28, 1968     4 Sheets-Sheet 1

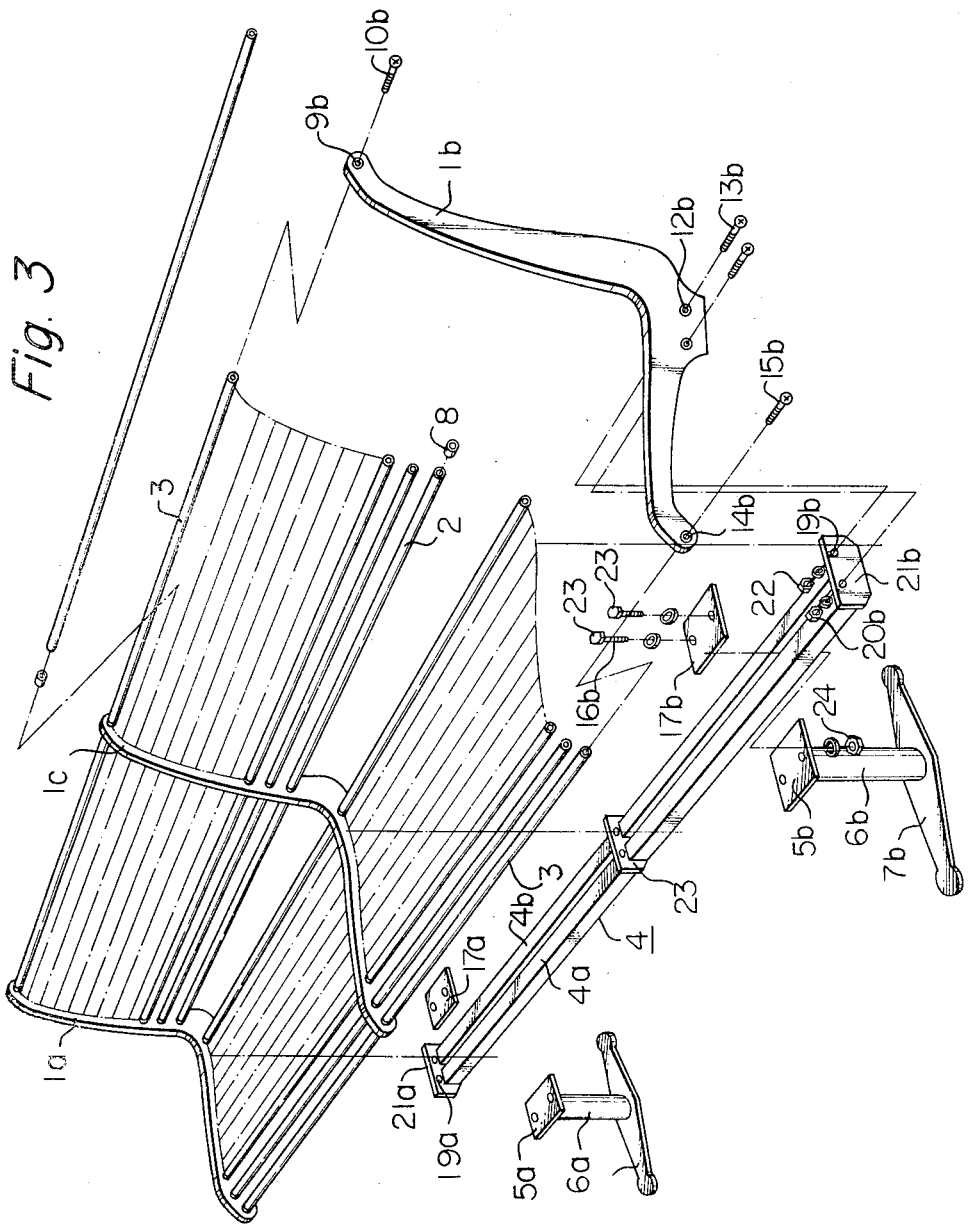

Fig. 4B
Fig. 4A
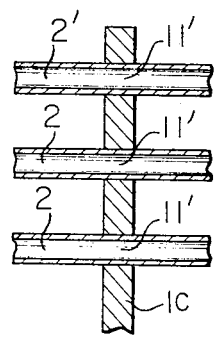
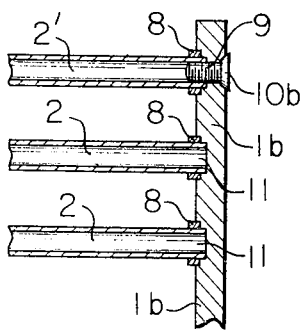
Fig. 5
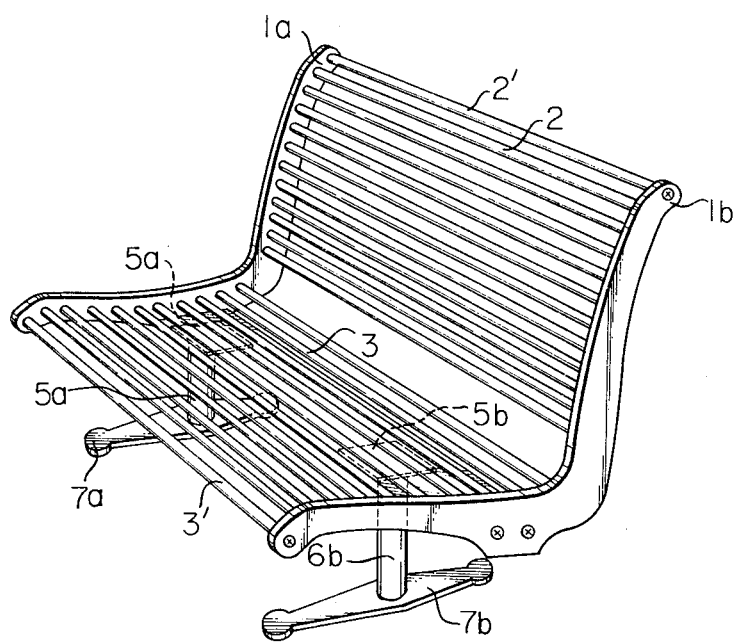

May 12, 1970  SOHEI SUZUKI  3,511,536
BENCH

Filed Aug. 28, 1968  4 Sheets-Sheet 4

United States Patent Office 3,511,536
Patented May 12, 1970

3,511,536
BENCH
Sohei Suzuki, Gifu-shi, Japan, assignor to Tenryu Kogyo Kabushiki Kaisha, Kagamihara-shi, Gufu-ken, Japan, a company of Japan
Filed Aug. 28, 1968, Ser. No. 755,897
Int. Cl. A47c 7/00
U.S. Cl. 297—440            5 Claims

ABSTRACT OF THE DISCLOSURE

Bench of the invention comprises a plurality of reinforced plastic pipes in a parallel condition, a plurality of frames for supporting the pipes and an under beam joining the frames in one body and a pair of legs secured to the beam. All elements of the bench are fixed by fasteners such as bolt and nut.

The present invention relates to an improved bench comprising a plurality of reinforced plastic pipes, particularly relates to an improved bench having simple structure which can be assembled and disassembled into its elements easily.

Generally, bench for public places such as platforms in stations and in parks must be practical and also must be ornamental.

Further, it is desirable that the bench can be assembled and disassembled into its elements easily.

The principal object of the present invention is to provide an improved bench which is sufficiently practical for use in public places.

Another object of the present invention is to provide an improved bench having simple structure which can be assembled and disassembled into its elements easily.

Further objects of the present invention is to provide an improved bench which is ornamental also.

Generally, bench of the present invention comprises a plurality of frames for securing a plurality of reinforced plastic pipes in a parallel condition and a plurality of legs for supporting the frames. One group of the reinforced plastic pipes are arranged as the seat of the bench and the other group of the reinforced plastic pipes are arranged as the back of the bench. It is one of features of the invention that all of the reinforced plastic pipes are used without any radial aperture and the fixing of the elements of the bench is performed by so-called thread fixing by bolt and nut or screw thread. Consequently, the bench of the present invention can be assembled and disassembled into its elements easily. The seat and back of the bench of the invention comprises mainly a plurality of reinforced plastic pipes which provides persons who sit on the bench with comfortable feeling caused by deformation of the plastic pipes to fit the body of the person. Further, to provide comfortable feeling to persons who sit on the bench of the invention, the arrangement of the pipes, in other words, the shape of the frame securing the pipes are particularly designed. This is also one of the features of the bench of the invention.

Further features and advantages of the present invention will be more clearly understood from the following description, reference being made to the attached drawings and claims.

FIG. 3 is an explanatory drawing of the bench shown in FIG. 1, with the elements of the bench in an exploded condition, FIGS. 4A and 4B are explanatory drawings showing the securing condition of the plastic pipes to the frames of the bench shown in FIG. 1, FIGS. 5 and 6 are perspective views of other embodiments of the bench according to the present invention.

Figure 1:
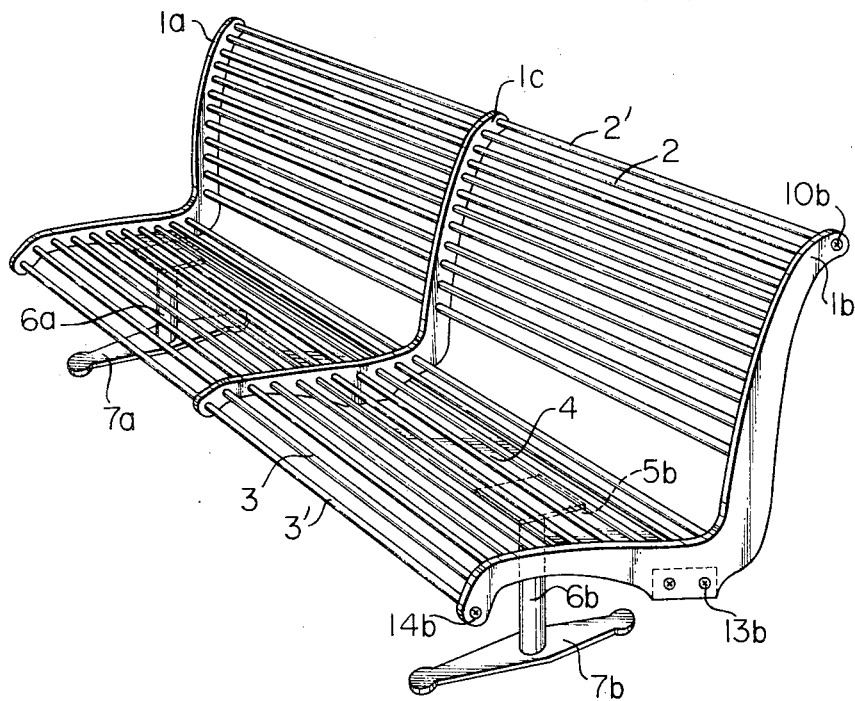
FIG. 1 is a perspective view of the bench of the invention.
Figure 2:
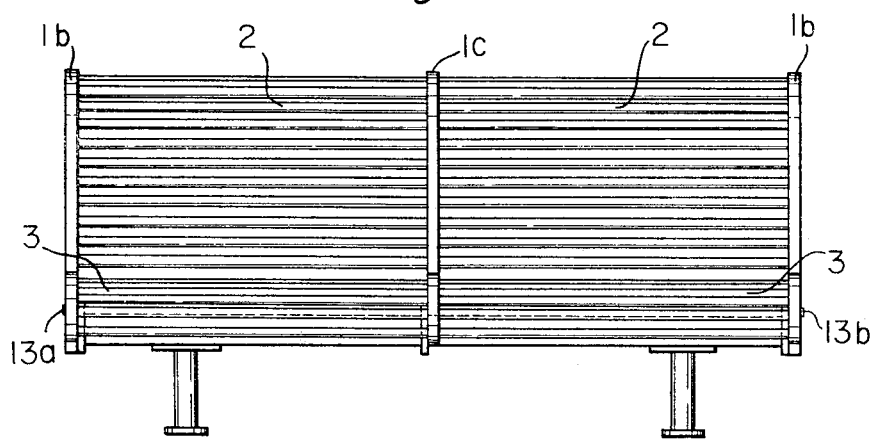
FIG. 2 is an elevation of the bench shown in FIG. 1.

Refering to FIGS. 1, 2, 3 and 4A and 4B, a bench of an embodiment of the invention comprises a pair of side frames 1a and 1b and a central supporting frame 1c, a seat portion comprising a plurality of reinforced plastic pipes 3 and 3' and a back portion comprising a plurality of reinforced plastic pipes 2', secured to the side frames 1a and 1b and supported by the central frame 1c respectively, and a pair of legs 6a and 6b secured to a beam 4 secured to the side frames 1a and 1b at their bottom portion by set bolts 13a and 13b. The top pipe 2' and the bottom pipe 3' are provided with screw threads at both of their ends for engaging the respective set bolts 10a, 10b, 14a and 14b, while the other pipes 2 and 3 are provided with plain cut end portions. Consequently, the pipes 2' and 3' are secured to the side frames 1a and 1b by the respective set bolts 10a, 10b, 14a and 14b, while the other pipes are engaged with the respective apertures 11 disposed to the respective side frames 1a and 1b through bushings made of plastic material or rubber.

Concerning the central frame 1c, the frame 1c is provided with a plurality of apertures passing through it for supporting the respective pipes 2, 2'; and 3 and 3'.

At both ends of the beam 4, a pair of side plates 21a and 21b are secured, and at its middle portion, a middle plate 3 is secured as shown in FIG. 3. These plates 21a, 21b and 23 are provided with a pair of apertures passing through them for passing the respective bolts to fix the beam 4 to the side frames 1a and 1b, and the central frame 1c. The beam 4 comprises a pair of sub-beams 4a and 4b, both end portions of which are secured to the respective side plates 21a and 21b in such a way that the sub-beams 4a and 4b are arranged in a parallel condition with a clearance between them, as shown in FIGS. 4A and 4B. The clearance between the sub-beams 4a and 4b is defined in order to permit the passing of set bolts for fixing the legs 6a and 6b to the beam 4. At the middle portion of the beam 4, and intermediate plate 2" is also secured. These plates 21a, 21b and 2" are provided with a pair of apertures passing through them for passing the respective bolts to fix the beam 4 to the side frames 1a and 1b, and the central frame 1c. The legs 6a and 6b are provided with plates 5a and 5b horizontally secured to the top portion of the respective legs, and are provided with horizontal supports 7a and 7b secured to the bottom portion of the respective legs 6a and 6b. The plates 5a and 5b are provided with a pair of apertures for passing set bolts 3. The plates 17a and 17b are used for securing the legs 6a and 6b to the beam 4. The plates 17a, 17b are provided with a pair of apertures disposed to the portion corresponding to the apertures disposed to the plates 5a and 5b, respectively.

Consequently, when assembling the above-mentioned bench, first, the legs 6a and 6b are secured to the beam 4 at the desirable symmetrical position by setting bolts 23 and nuts 24 in such a way that the bolts 23 pass the apertures of the plates 17a and 5a, 17b and 5b while passing through the intervened space between the sub beams 4a and 4b. Next, the side plates 21a and 21b, and central plate 21c are supported by the respective bolts 13a, 13b and 13c in a loose condition, and then all pipes 2, 2', 3, 3' are passed through the aperture 11' of the central frame 1c, and the all end portions of the pipes 2, 2', 3 and 3' are inserted into the respective apertures 9 and 11 of the side frames 1a and 1b. Then the pipes 2', 3', the side plates 21a, 21b and 23 are secured to the side frames 1a and 1b and the central frame 1c by the respective set screw bolts or bolts and nuts. Therefore, it is easy to disassemble the bench into its elements by taking off the pipes 2, 2′, 3 and 3′ from the side frames 1a and 1b and the central frame 1c, the legs 6a and 6b from the beam 4 and the beam 4 from the side frames 1a and 1b and the central frame 1c. Consequently, the bench of the invention can be transported as a compact package.

The shape of the seat and the back of the bench of the invention are preferably designed to provide comfortable feeling to persons sitting on the bench. The shape of the seat and the back of the bench are defined by the shape of the side frames 1a and 1b and the central frame 1c. Moreover, the legs 6a and 6b can be secured to any position of the beam 4 by sliding the 5a and 17a, 5b and 17b along the beam 4.

In the following explanation, all elements of the bench of the present invention corresponding to the first embodiment of the invention are designated by the same numerals as the first embodiment shown in FIGS. 1, 2, 3, 4A and 4B, for easy understanding.

In FIG. 5, another embodiment of the bench of the invention is shown. In this case, all elements and structures of the bench are similar to the first embodiment of the bench shown in FIGS. 1, 2, 3, 4A and 4B with the exception that the central frame is omitted.

Figure 6:
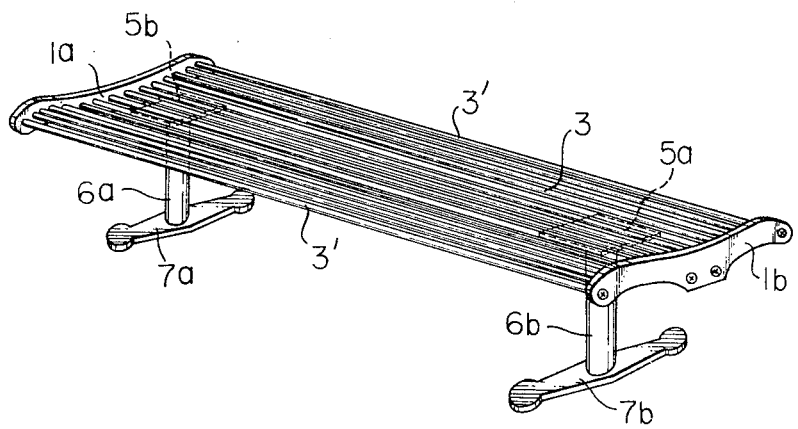

In FIG. 6, another embodiment of the bench of the invention is shown. In this case, all elements and structures of the bench are similar to the second embodiment of the invention shown in FIG. 5 with the exception that the back portion of the bench is omitted. The arrangement of the pipes forming the seat portion of the bench is defined in order to obtain comfortable feeling of persons sitting on the seat, consequently, it is not necessary to arrange the pipes 2, 2′ in the same place.

While the invention has been described in conjunction with certain embodiments thereof it is to be understood that various modifications and changes may be made without departing from the spirit and scope of the invention.

What is claimed is:

1. An improved bench, comprising at least one pair of side frames provided with a plurality of apertures, a plurality of reinforced pipes horizontally secured to said frames in a parallel condition, a group of said reinforced pipes forming the seat portion of said bench, a beam disposed under said seat portion of said bench and secured to said side frames, a pair of legs secured to said beam, a pair of said pipes disposed at both edge portions of the arrangement of said pipes provided with screw thread portions at both ends of them, and secured to said side frames by the respective screw thread of fasteners passing through said aperture respectively, the remaining pipes supported by said frames only by engagement of end of them with said apertures of said side frames respectively, said beam secured at both of its ends to said side frames by bolts and nuts, and said legs secured perpendicularly to said beam by bolts and nuts.

2. An improved bench according to claim 1, wherein another group of said reinforced pipes forms the back seat of said bench.

3. An improved bench according to claim 1, further characterized by a central supporting frame provided with plurality of apertures supporting the middle portion of said pipes passing through the respective apertures and secured to the middle portion of said beam by bolts and nuts.

4. An improved bench according to claim 1, wherein said ends of pipes are engaged with the respective apertures disposed to said side frames through the respective bushes.

5. An improved bench, comprising at least a pair of side frames provided with a plurality of apertures, a plurality of reinforced pipes horizontally secured to said pipes in a parallel condition, said reinforced pipes forming the seat portion of said bench, a beam disposed under said seat portion of said bench and secured to said side frames, a pair of legs secured to said beam, a pair of said pipes disposed at both edge portions of the arrangement of said pipes provided with screw thread portions at both of their ends and secured to said side frames by the respective screw thread of fasteners passing through the respective aperture, the remaining pipes supported by said side frames only by engagement of their ends with said apertures said side frames respectively, said beam secured at both of its ends to said side frames by bolts and nuts and said legs are perpendicularly secured to said beam by bolts and nuts.

References Cited

UNITED STATES PATENTS

| | | | |
|---|---|---|---|
| 181,360 | 8/1876 | Osgood | 297—445 |
| 3,131,970 | 5/1964 | McGregor | 297—445 |
| 3,183,036 | 5/1965 | Hill | 297—440 |
| 3,329,465 | 7/1967 | King | 297—440 |
| 3,379,474 | 4/1968 | Schwarz | 297—440 |

REINALDO P. MACHADO, Primary Examiner

U.S. Cl. X.R.

297—450